(12) United States Patent
Wajcer et al.

(10) Patent No.: US 10,135,518 B2
(45) Date of Patent: Nov. 20, 2018

(54) ECHO CANCELLATION IN COMMUNICATION TRANSCEIVERS

(71) Applicant: NOVELSAT LTD., Ra'anana (IL)

(72) Inventors: Daniel Wajcer, Beit Yehoshua (IL); Avihay Sadeh Shirazi, Tel-Aviv (IL); Dan Peleg, Sde Itzhak (IL); Yuval Shalom, Neve Monosson (IL); Itzhak Wulkan, Ra'anana (IL)

(73) Assignee: NOVELSAT LTD., Ra'anana (IL)

( * ) Notice: Subject to any disclaimer, the term of this patent is extended or adjusted under 35 U.S.C. 154(b) by 0 days.

(21) Appl. No.: 14/439,675

(22) PCT Filed: Nov. 4, 2013

(86) PCT No.: PCT/IB2013/059887
§ 371 (c)(1),
(2) Date: Apr. 30, 2015

(87) PCT Pub. No.: WO2014/076606
PCT Pub. Date: May 22, 2014

(65) Prior Publication Data
US 2015/0244450 A1 Aug. 27, 2015

Related U.S. Application Data

(60) Provisional application No. 61/726,592, filed on Nov. 15, 2012.

(51) Int. Cl.
*H04B 7/00* (2006.01)
*H04B 7/155* (2006.01)
(Continued)

(52) U.S. Cl.
CPC ..... *H04B 7/15585* (2013.01); *H04B 7/18515* (2013.01); *H04B 7/18517* (2013.01); *H04L 25/03343* (2013.01)

(58) Field of Classification Search
CPC ............ H04B 7/15585; H04B 7/15535; H04L 27/2607; H04L 27/2613
(Continued)

(56) References Cited

U.S. PATENT DOCUMENTS 5,596,439 A * 1/1997 Dankberg ................ H04B 1/12
370/201
5,664,011 A * 9/1997 Crochiere ................ H04B 3/23
379/406.08
(Continued)

FOREIGN PATENT DOCUMENTS

CA 2721190 A1 10/2009
EP 1087559 B1 1/2010
(Continued)

OTHER PUBLICATIONS

S. Jayasimha et al., "Canceling Echoes Distorted by Satellite Transponders," Paper presented in National Coference on Communication, Indian Institute of Technology, Jan. 27-29, 2006.*
(Continued)

*Primary Examiner* — Berhanu Tadese
(74) *Attorney, Agent, or Firm* — D. Kligler IP Services Ltd.

(57) ABSTRACT

A method includes, in a transceiver (28, 160), receiving from a repeater (32, 168) a received signal that includes a desired signal for reception and an undesired replica of a transmitted signal that was transmitted from the transceiver and retransmitted by the repeater. A local copy of the transmitted signal is generated in the transceiver. The local copy is matched with the undesired replica of the transmitted signal in the received signal, by adapting the received signal while retaining the local copy non-adaptive. An interference caused by the undesired replica to the desired signal is canceled, by subtracting the local copy from the adapted received signal.

24 Claims, 4 Drawing Sheets

(51) Int. Cl.
*H04B 7/185* (2006.01)
*H04L 25/03* (2006.01)

(58) Field of Classification Search
USPC .......................................................... 375/214
See application file for complete search history.

(56) References Cited

U.S. PATENT DOCUMENTS

| | | | |
|---|---|---|---|
| 5,764,694 A * | 6/1998 | Rahamim | H04B 3/46 370/289 |
| 6,011,952 A * | 1/2000 | Dankberg | H04B 1/126 455/24 |
| 6,031,882 A * | 2/2000 | Enge | H04B 1/711 375/343 |
| 6,157,811 A * | 12/2000 | Dent | H01Q 1/288 455/12.1 |
| 6,256,486 B1 * | 7/2001 | Barany | H04B 1/1027 455/296 |
| 6,418,161 B1 | 7/2002 | Shively et al. | |
| 6,430,391 B1 * | 8/2002 | Dent | H04B 7/18513 370/315 |
| 6,466,958 B1 | 10/2002 | Van Wechel et al. | |
| 6,597,750 B1 | 7/2003 | Knutson et al. | |
| 6,675,307 B1 | 1/2004 | Heitkamp et al. | |
| 6,725,017 B2 | 4/2004 | Blount et al. | |
| 6,859,641 B2 * | 2/2005 | Collins | H04B 7/18513 455/63.1 |
| 6,907,093 B2 * | 6/2005 | Blount | H04B 1/525 375/211 |
| 6,975,582 B1 | 12/2005 | Karabinis et al. | |
| 6,996,164 B1 * | 2/2006 | Blount | H04B 1/525 375/219 |
| 7,031,370 B1 * | 4/2006 | Fukumasa | H04B 1/707 375/141 |
| 7,113,557 B2 | 9/2006 | Kaku et al. | |
| 7,228,104 B2 * | 6/2007 | Collins | H04B 7/18513 455/139 |
| 7,522,877 B1 * | 4/2009 | Avellan | H04B 7/18517 455/12.1 |
| 7,639,761 B2 * | 12/2009 | Chu | H04B 1/1027 375/230 |
| 7,729,657 B1 * | 6/2010 | Avellan | H04B 7/18582 370/310 |
| 7,782,935 B1 | 8/2010 | Wong et al. | |
| 7,991,373 B2 * | 8/2011 | Miller | H04B 1/123 455/260 |
| 8,446,936 B2 * | 5/2013 | Kim | 375/211 |
| 8,644,866 B2 | 2/2014 | Wajcer et al. | |
| 9,967,021 B2 * | 5/2018 | Potter | H04B 15/00 |
| 2001/0038674 A1 | 11/2001 | Trans | |
| 2002/0098802 A1 | 7/2002 | Karabinis | |
| 2002/0110206 A1 | 8/2002 | Becker et al. | |
| 2002/0197958 A1 * | 12/2002 | Collins | H04B 7/18513 455/63.1 |
| 2003/0054760 A1 * | 3/2003 | Karabinis | H04B 7/1853 455/12.1 |
| 2003/0054762 A1 | 3/2003 | Karabinis | |
| 2003/0063577 A1 * | 4/2003 | Hayward | H04B 3/23 370/286 |
| 2003/0165233 A1 * | 9/2003 | Veitch | H04M 1/738 379/399.01 |
| 2003/0174675 A1 * | 9/2003 | Willenegger | H04B 7/022 370/335 |
| 2003/0185176 A1 * | 10/2003 | Lusky | H04L 1/0001 370/335 |
| 2003/0224723 A1 | 12/2003 | Sun et al. | |
| 2003/0235294 A1 * | 12/2003 | Dyba | H04B 3/23 379/406.01 |
| 2004/0042561 A1 | 3/2004 | Ho et al. | |
| 2004/0042569 A1 * | 3/2004 | Casabona | H04B 7/18513 375/346 |
| 2004/0105403 A1 * | 6/2004 | Lin | H04B 7/18582 370/316 |
| 2005/0111347 A1 * | 5/2005 | Breiling | H04B 7/0669 370/206 |
| 2005/0159128 A1 * | 7/2005 | Collins | H04B 7/18513 455/284 |
| 2005/0190870 A1 | 9/2005 | Blount et al. | |
| 2005/0220043 A1 * | 10/2005 | Handel | H04B 3/23 370/286 |
| 2006/0023821 A1 * | 2/2006 | Barnette | H04B 3/23 375/355 |
| 2006/0040611 A1 * | 2/2006 | Ding | H04B 7/15585 455/11.1 |
| 2006/0067446 A1 * | 3/2006 | Maeda | H04B 1/1027 375/349 |
| 2006/0121946 A1 * | 6/2006 | Walton | H04B 7/0417 455/561 |
| 2006/0182203 A1 * | 8/2006 | Miller | H04B 7/04 375/340 |
| 2006/0222113 A1 | 10/2006 | Harrison | |
| 2007/0066226 A1 | 3/2007 | Cleveland et al. | |
| 2007/0211794 A1 | 9/2007 | Dabiri et al. | |
| 2008/0137763 A1 * | 6/2008 | Waters | H04L 25/03006 375/260 |
| 2009/0028222 A1 * | 1/2009 | Shnaider | H04B 1/7103 375/148 |
| 2009/0102706 A1 | 4/2009 | Goldblatt et al. | |
| 2009/0154620 A1 * | 6/2009 | Mostafa | H04B 17/345 375/346 |
| 2009/0175465 A1 * | 7/2009 | Kwon | H04B 1/1027 381/93 |
| 2009/0274202 A1 | 11/2009 | Hanke et al. | |
| 2010/0056192 A1 | 3/2010 | Lachman et al. | |
| 2010/0194987 A1 * | 8/2010 | Kim | H04B 7/15585 348/575 |
| 2010/0284447 A1 * | 11/2010 | Gore | H04B 7/15585 375/211 |
| 2010/0285735 A1 * | 11/2010 | Gore | H04B 7/15535 455/7 |
| 2010/0285738 A1 * | 11/2010 | Howard | H04B 7/15535 455/9 |
| 2011/0058595 A1 * | 3/2011 | Skeet | H04L 27/38 375/232 |
| 2011/0116392 A1 * | 5/2011 | Barriac | H04B 7/15585 370/252 |
| 2011/0116531 A1 * | 5/2011 | Gore | H04B 7/15585 375/213 |
| 2011/0135043 A1 * | 6/2011 | Downey | H04J 11/004 375/346 |
| 2011/0261863 A1 | 10/2011 | Chandra et al. | |
| 2011/0268168 A1 * | 11/2011 | Dybdal | H04L 25/03171 375/225 |
| 2011/0311007 A1 | 12/2011 | Nuutinen et al. | |
| 2012/0076220 A1 * | 3/2012 | Kimura | H04L 25/03343 375/260 |
| 2012/0115412 A1 * | 5/2012 | Gainey | H04B 3/23 455/7 |
| 2012/0214524 A1 * | 8/2012 | Wajcer | H04B 1/109 455/502 |
| 2012/0282872 A1 | 11/2012 | Banwell et al. | |
| 2013/0077661 A1 * | 3/2013 | Jacobsen | H04W 72/0473 375/219 |
| 2013/0078907 A1 * | 3/2013 | Gore | H04B 7/15535 455/11.1 |
| 2013/0083917 A1 * | 4/2013 | Peng | H04B 1/525 379/406.09 |
| 2013/0089021 A1 * | 4/2013 | Gaal | H04B 7/155 370/315 |
| 2013/0294494 A1 * | 11/2013 | Wang | H04B 1/71055 375/233 |
| 2013/0343437 A1 | 12/2013 | Li et al. | |
| 2014/0004794 A1 | 1/2014 | Contaldo et al. | |
| 2014/0079163 A1 * | 3/2014 | Miller | H04L 27/2655 375/343 |

(56) References Cited

U.S. PATENT DOCUMENTS

2015/0131761 A1* 5/2015 Potter .................. H04B 1/0475
375/340
2015/0244450 A1* 8/2015 Wajcer ............... H04B 7/15585
375/214
2018/0019799 A1* 1/2018 Potter .................. H04B 7/1851

FOREIGN PATENT DOCUMENTS

| EP | 2445122 A1 * | 4/2012 | ......... H04B 7/15585 |
|----|---|---|---|
| WO | 2007078032 A1 | 7/2007 | |
| WO | 2012055469 A1 | 5/2012 | |

OTHER PUBLICATIONS

Verdu, S, "Multiuser Detection," Cambridge University Press, chapter 7, pp. 344-393, year 1998.
International Patent Application PCT/IB2012/050622 search report dated Jul. 19, 2012.
U.S. Appl. No. 13/031,216 Office Action dated Jul. 2, 2013.
International Patent Application PCT/IB2013/059887 search report dated Feb. 26, 2014.
International Patent Application PCT/IB2016/050024 search report dated Mar. 28, 2016.
European Application # 13856048.7 Search Report dated Jun. 21, 2016.
U.S. Appl. No. 15/540,268 office action dated Jun. 14, 2018.

* cited by examiner

ECHO CANCELLATION IN COMMUNICATION TRANSCEIVERS

CROSS-REFERENCE TO RELATED APPLICATIONS

This application claims the benefit of U.S. Provisional Patent Application 61/726,592, filed Nov. 15, 2012, whose disclosure is incorporated herein by reference.

FIELD OF THE INVENTION

The present invention relates generally to wireless communication, and particularly to methods and systems for echo cancellation in communication transceivers.

BACKGROUND OF THE INVENTION

Wireless communication receivers are often subject to interference that degrades reception performance. Various techniques for interference cancellation are known in the art.

For example, U.S. Pat. Nos. 5,596,439 and 6,011,952, whose disclosures are incorporated herein by reference, describe techniques in which a source transmitted signal is cancelled at a receiver associated with the transmitter, so that the desired received signal can be extracted from a composite received signal, the composite received signal consisting of the source signal relayed from the relay station along with the desired received signal from the other user in the pair, plus additive noise.

U.S. Pat. No. 6,725,017, whose disclosure is incorporated herein by reference, describes multi-channel self-interference cancellation in relayed electromagnetic communication between a first device and one or more other devices on one or more shared frequency channels. Specifically, near signals are generated at the first device and transmitted to a relay station. A composite signal is received at the first device from the relay station containing relayed versions of the near signals and relayed versions of remote signals transmitted from the one or more other devices, the composite signal having frequency channels including the one or more shared frequency channels, each shared frequency channel occupied by at least one of the relayed near signals and one of the relayed remote signals. One or more cancellation signals are selectively generated, each having a frequency band corresponding to one of the shared frequency channels. The cancellation signals are combined with the composite signal to produce a desired signal representing the relayed remote signals.

U.S. Pat. No. 6,859,641, whose disclosure is incorporated herein by reference, describes an adaptive interference canceller for canceling an interfering signal corresponding to a delayed, frequency translated, amplitude and phase offset version of a transmitted signal contained in a composite received signal relayed through a relay system such as a satellite transponder. The canceller digitally down-converts the received signal and a local replica of the transmitted signal from IF to baseband, applies a variable delay and frequency compensation to the replica as a coarse delay and frequency correction, and tracks fine delay, amplitude and phase differences using an adaptive finite impulse response filter to generate a cancellation signal corresponding to the delayed and frequency shifted version. A minimum output power process produces an error signal that drives the variable delay and adaptive filter to minimize the power in the signal of interest to maximize cancellation of the interfering signal.

U.S. Pat. No. 6,907,093, whose disclosure is incorporated herein by reference, describes self-interference cancellation in two-way relayed electromagnetic communication between a first device and a second device through a relay station, wherein a representation of a relayed composite signal above baseband and a representation of a locally modulated interface signal above baseband interact to effect the self-interference cancellation. Specifically, the composite signal, which contains a relayed version of the locally modulated (near) signal from the first device and a relayed version of a modulated far signal from the second device, is received at the first device from the relay station. The composite signal is then provided in a representation as a first interface signal at a first frequency at or above baseband to a canceller module of the first device and a representation of the modulated near signal at a second frequency above baseband is provided as a second interface signal to the canceller module. Part of the relayed version of the modulated near signal is canceled from the representation of the composite signal using the representation of the modulated near signal as provided to the canceller module to produce a third interface signal as output at a third frequency at or above baseband.

U.S. Pat. No. 6,996,164, whose disclosure is incorporated herein by reference, describes self-interference cancellation in two-way relayed communications, by creating models of up-converter and down-converter imperfections and then compensating for those imperfections before self interference cancellation processing. The model includes compensation for phase offset, for amplitude imbalance and for leakage in the mixers.

U.S. Pat. No. 7,228,104, whose disclosure is incorporated herein by reference, describes an adaptive interference canceller for canceling an interfering signal corresponding to a delayed, frequency translated, amplitude and phase offset version of a transmitted signal contained in a composite received signal relayed through a relay system such as a satellite transponder. The canceller digitally down-converts the received signal and a local replica of the transmitted signal from IF to baseband, applies a variable delay and frequency compensation to the replica as a coarse delay and frequency correction, and tracks fine delay, amplitude and phase differences using an adaptive finite impulse response filter to generate a cancellation signal corresponding to the delayed and frequency shifted version. A minimum output power process produces an error signal that drives the variable delay and adaptive filter to minimize the power in the signal of interest to maximize cancellation of the interfering signal.

U.S. Pat. No. 7,349,505, whose disclosure is incorporated herein by reference, describes techniques for providing self-interference cancellation in two-way relayed electromagnetic communication between a first and a second device through a relay station, involving retrofitting existing equipment comprising a transmitter system and a receiver system at the first device by adding a canceller module, providing a version of a modulated near signal as a first non-baseband interface signal from the transmitter system to the canceller module, providing a version of a composite signal as a second non-baseband interface signal from the receiver system to the canceller module, generating a cancellation signal at the canceller module corresponding to a relayed version of the modulated near signal, using the first and the second non-baseband interface signals, applying the cancellation signal at the canceller module to a version of the second non-baseband interface signal, to produce a cancellation-processed signal as a third non-baseband interface signal provided to the receiver system.

U.S. Pat. No. 7,522,877, whose disclosure is incorporated herein by reference, describes a method for reduction of echo noise in satellite communications, including receiving an aggregate signal from multiple remote stations, where the aggregate signal includes a transmit signal, whose bandwidth is in the range of 0.1 MHz to 66 MHz, is previously sent from a hub to the multiple receiving stations, computing a scaled, delayed and distorted replica of the transmit signal and using the replica to compensate for satellite transponder nonlinearities and reduce echo noise interference from a received aggregate signal received by the hub from the multiple remote stations.

U.S. Pat. No. 7,991,373, whose disclosure is incorporated herein by reference, describes a signal filtering system for a frequency reuse system. A first implementation includes a downlink baseband signal, coupled to a downlink bandwidth filter, including a composite received signal including at least an interfering signal and a signal of interest, each having a composite bandwidth, a first bandwidth, and a second bandwidth, respectively. An uplink baseband signal may be included, coupled to an uplink bandwidth filter, having a replica of the interfering signal corresponding with the interfering signal and having an interference bandwidth. A baseband processing module may be coupled with the downlink bandwidth filter and the uplink bandwidth filter and may be configured to cancel the interfering signal from the composite received signal using the replica of the interfering signal. The downlink bandwidth filter may be configured to reduce the composite bandwidth and the uplink bandwidth filter may be configured to reduce the interference bandwidth.

SUMMARY OF THE INVENTION

An embodiment of the present invention that is described herein provides a method including, in a transceiver, receiving from a repeater a received signal that includes a desired signal for reception and an undesired replica of a transmitted signal that was transmitted from the transceiver and retransmitted by the repeater. A local copy of the transmitted signal is generated in the transceiver. The local copy is matched with the undesired replica of the transmitted signal in the received signal, by adapting the received signal while retaining the local copy non-adaptive. An interference caused by the undesired replica to the desired signal is canceled, by subtracting the local copy from the adapted received signal.

In some embodiments, the repeater includes a satellite. In an embodiment, the received signal and the transmitted signal occupy overlapping spectra. in a disclosed embodiment, adapting the received signal includes adjusting at least one parameter selected from a group of parameters consisting of an amplitude, a phase, a frequency and a timing of the received signal, so as to match the respective at least one parameter of the local copy. Additionally or alternatively, adapting the received signal includes estimating an Inter-Symbol Interference (ISI) transfer function between the received signal and the local copy, and filtering the received signal using the ISI transfer function. In an embodiment, generating the local copy includes applying a delay to a stream of digital samples that are used for producing the transmitted signal.

In some embodiments, the transceiver includes a first modem and a second modem, and the method includes: using the first modem, transmitting the transmitted signal to first and second terminals, and receiving a first received signal from the first terminal; and, using the second modem, receiving a second received signal from the second terminal, accepting from the first modem an auxiliary signal that is indicative of the transmitted signal, and using the auxiliary signal to cancel the interference caused by the undesired replica of the transmitted signal to the second received signal. In an example embodiment, the auxiliary signal includes data that is modulated by the first modem so as to produce the transmitted signal. In an alternative embodiment, the auxiliary signal includes the local copy of the transmitted signal, produced in the first modem.

In an embodiment, receiving the received signal includes sampling the received signal using baseband sampling, and generating the local copy, matching the local copy with the undesired replica and canceling the interference include performing In-phase/Quadrature signal processing. In an alternative embodiment, receiving the received signal includes sampling the received signal using Intermediate Frequency (IF) sampling, and generating the local copy, matching the local copy with the undesired replica and canceling the interference include performing real-value signal processing.

There is additionally provided, in accordance with an embodiment of the present invention, apparatus including a front end and a mode. The front end is configured to exchange signals with a repeater. The modem is configured to receive from the repeater via the front end a received signal, which includes a desired signal for reception and an undesired replica of a transmitted signal that was transmitted from the apparatus and retransmitted by the repeater, to generate a local copy of the transmitted signal, to match the local copy with the undesired replica of the transmitted signal in the received signal, by adapting the received signal while retaining the local copy non-adaptive, and to cancel an interference caused by the undesired replica to the desired signal, by subtracting the local copy from the adapted received signal.

There is also provided, in accordance with an embodiment of the present invention, a method including, in a transceiver, receiving from a repeater a received signal, which includes a desired signal for reception and an undesired replica of a transmitted signal that was transmitted from the transceiver and retransmitted by the repeater. The received signal is sampled using Intermediate Frequency (IF) sampling. Using real-value signal processing operations, a local digital copy of the transmitted signal is generated in the transceiver, the local copy is matched with the undesired replica of the transmitted signal in the IF-sampled received signal, by adapting the received signal while retaining the local copy non-adaptive, and an interference caused by the undesired replica to the desired signal is canceled by subtracting the local copy from the adapted received signal.

There is also provided, in accordance with an embodiment of the present invention apparatus including a front end and a mode. The front end is configured to exchange signals with a repeater. The modem is configured to sample the received signal using Intermediate Frequency (IF) sampling, and, using real-value signal processing operations, to generate a local digital copy of the transmitted signal, to match the local copy with the undesired replica of the transmitted signal in the IF-sampled received signal, by adapting the received signal while retaining the local copy non-adaptive, and to cancel an interference caused by the undesired replica to the desired signal, by subtracting the local copy from the adapted received signal.

The present invention will be more fully understood from the following detailed description of the embodiments thereof, taken together with the drawings in which:

DETAILED DESCRIPTION OF EMBODIMENTS

Overview

Figure 1:
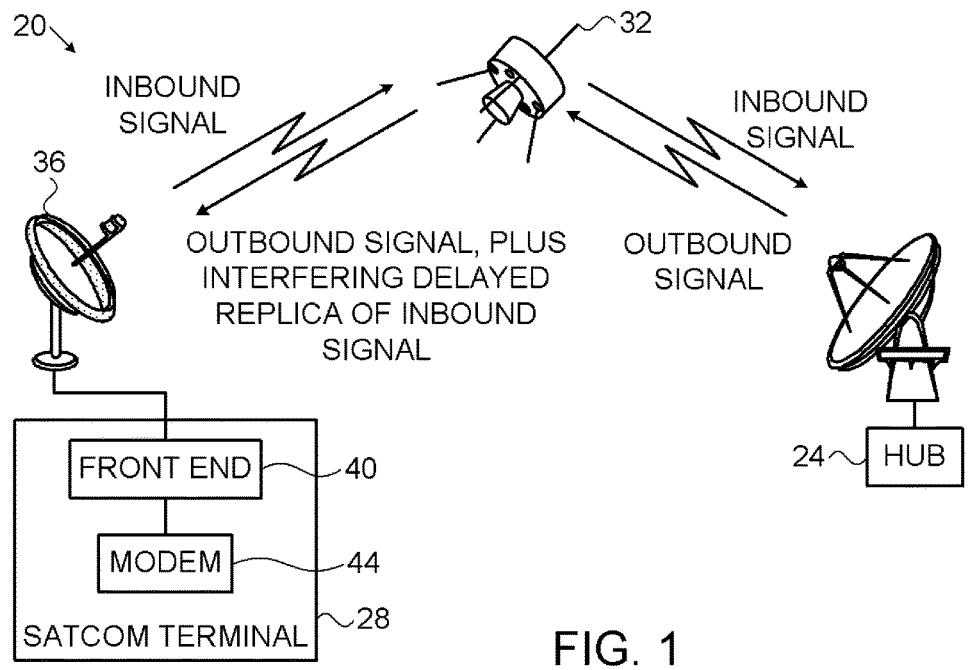
FIG. 1 is a block diagram that schematically illustrates a satellite communication system, in accordance with an embodiment of the present invention.

In some communication systems, a replica of a transmitted signal may cause interference to signal reception. Consider, for example, a satellite communication transceiver that receives a received signal from a satellite and transmits a transmitted signal to the satellite. In some scenarios, a delayed replica of the transmitted signal, which is retransmitted by the satellite, may be received by the terminal and interfere with reception. In other words, the received signal may comprise a desired signal plus an undesired delayed replica of the transmitted signal. An undesired replica of this sort is sometimes referred to as "echo." Such scenarios may occur, for example, when both directions of the satellite link reuse the same frequency band. Similar scenario may occur in other kinds of communication systems, as well.

Embodiments of the present invention that are described herein provide improved methods and systems for mitigating interference such the above-described echoes. The disclosed techniques can be used in various kinds of satellite communication transceivers, such as in a hub or user station. Although the embodiments described herein refer mainly to satellite communication, the disclosed echo cancellation techniques are similarly applicable to other kinds of communication systems that use repeaters. Thus, the term "repeater" is used herein in a broad sense, and includes satellites as well as other kinds of repeaters, such as airborne or terrestrial repeaters.

In some disclosed embodiments, the satellite communication transceiver generates a local copy of the transmitted signal, and matches the local copy with the undesired replica of the transmitted signal that is received as part of the received signal. Matching the signals may comprise matching of gain, phase, frequency and/or timing, typically across the entire signal bandwidth. After matching, the transceiver subtracts the local copy from the received signal, thereby canceling the interference caused by the replica of the transmitted signal.

In the embodiments described herein, the transceiver matches the local copy and the delayed replica of the transmitted signal by adapting the gain, phase, frequency and/or delay of the received signal. The gain, phase, frequency and delay of the local copy are retained non-adaptive.

Adapting the received signal rather than the local copy of the transmitted signal provides several important performance and implementation advantages. For example, the digital circuitry that carries out signal matching and cancellation is able to run at a low sampling rate, e.g., at one or two samples per symbol of the desired received signal. When the received and transmitted signals have substantially the same bandwidth, equalization and timing estimation may be performed at a low rate, e.g., one sample per symbol, and using a small number of filter taps.

Moreover, since the desired part of the received signal and the undesired replica of the transmitted signal pass through some common Inter-Symbol-Interference (ISI) sources (e.g., the satellite input and output multiplexers), the echo cancellation operation also compensates for this common ISI. As a result, additional equalization of the desired signal is eliminated or at least simplified considerably.

System Description

FIG. 1 is a block diagram that schematically illustrates a satellite communication system 20, in accordance with an embodiment of the present invention. System 20 comprises a hub 24 that communicates with one or more satellite communication (SATCOM) terminals 28 via a satellite 32. Terminals 28 are also referred to as transceivers (transmitters-receivers), and the two terms are used interchangeably herein. For the sake of clarity, FIG. 1 shows only a single terminal. The description of FIG. 1 refers to echo cancellation in the user-side terminal or station. This choice, however, is made purely by way of example. In alternative embodiments, the disclosed techniques can be used for echo cancellation in hub 24, or in any other suitable type of transceiver.

System 20 may operate in accordance with any suitable communication standard or protocol, such as the various Digital Video Broadcast (DVB) protocols. Although the embodiments described herein refer mainly to satellite communication, the disclosed techniques can be used in various terrestrial communication systems, as well.

In the present example, the communication direction from terminal 28 to hub 24 is referred to as inbound, and the communication direction from the hub to the terminal is referred to as outbound. This terminology, however, is used purely for the sake of clarity. Any other suitable terminology, e.g., forward-reverse or uplink-downlink, can also be used.

Thus, in the inbound direction, terminal 28 transmits an inbound signal toward satellite 32, and the satellite retransmits the inbound signal to hub 24. In the outbound direction, hub 24 transmits an outbound signal to satellite 32, and the satellite retransmits the outbound signal to terminal 28. In both directions, retransmission by the satellite may or may not involve change of frequency.

In some practical scenarios, the signal received at terminal 28 comprises a desired signal (the outbound signal) and an undesired signal (a delayed replica of the inbound signal that is retransmitted by satellite 32 toward hub 24 but also received by terminal 28). The undesired signal is also referred to as "echo." Interference due to echo is particularly severe when the inbound and outbound signals share the same frequency band (i.e., occupy overlapping spectra), and/or when the satellite transmission lobes are wide or omnidirectional.

In some embodiments, terminal 28 carries out an echo cancellation process that cancels the above-described interference. This process is explained in detail below. In the present example, terminal 28 comprises a front end 40 and a modem 44. Front end 40 down-converts the received signal from Radio Frequency (RF) to baseband or to Intermediate Frequency (IF), and up-converts the transmitted signal from baseband or from IF to RF. Modem 44 carries out the various signal processing functions of the terminal, and in particular echo cancellation.

Figure 5:
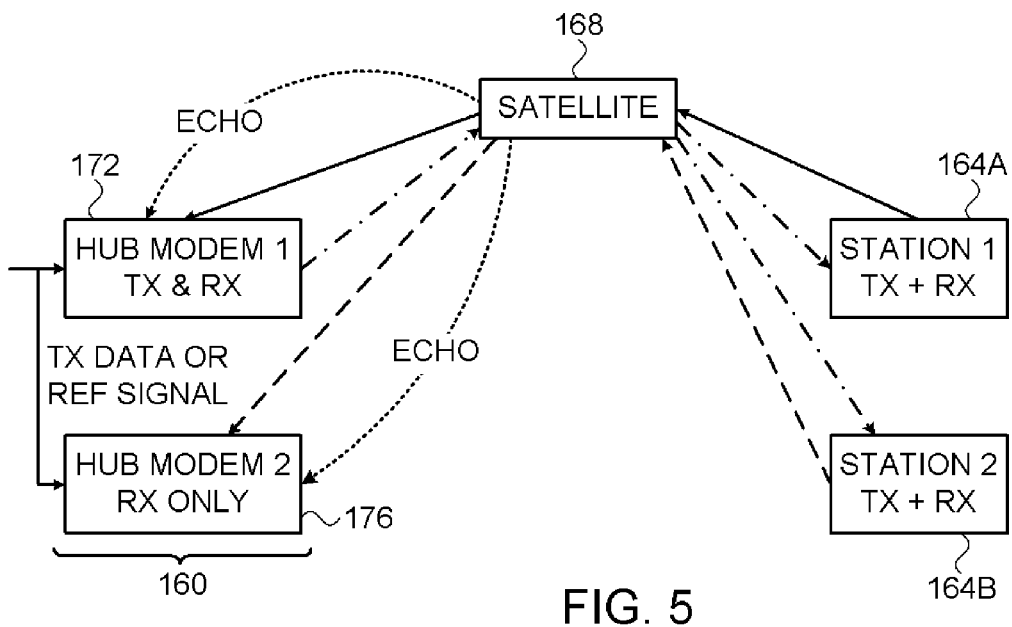
FIG. 5 is a block diagram that schematically illustrates a satellite communication system, in accordance with another embodiment of the present invention.

As noted above, although the embodiment of FIG. 1 refers to echo cancellation in terminal 28, the disclosed techniques can be used in other suitable communication equipment, for example in a modem of hub 24. Examples of hub-side echo cancellation using the disclosed techniques are shown in FIG. 5 below. Moreover, the disclosed techniques are not limited to satellite communication and may be used in various other applications, as well, for example in communication systems that use repeaters.

Echo Cancellation by Adaptation of the Received Signal

As noted above, the signal received at terminal 28 comprises a desired signal (the outbound signal) and an undesired signal (a delayed replica of the inbound signal that is retransmitted by satellite 32). In some embodiments, modem 44 cancels the interference caused by the undesired signal by adapting the amplitude (or gain), phase, frequency and/or timing (or delay) of the received signal, and then subtracts a local copy of the transmitted signal from the adapted received signal.

Figure 2:
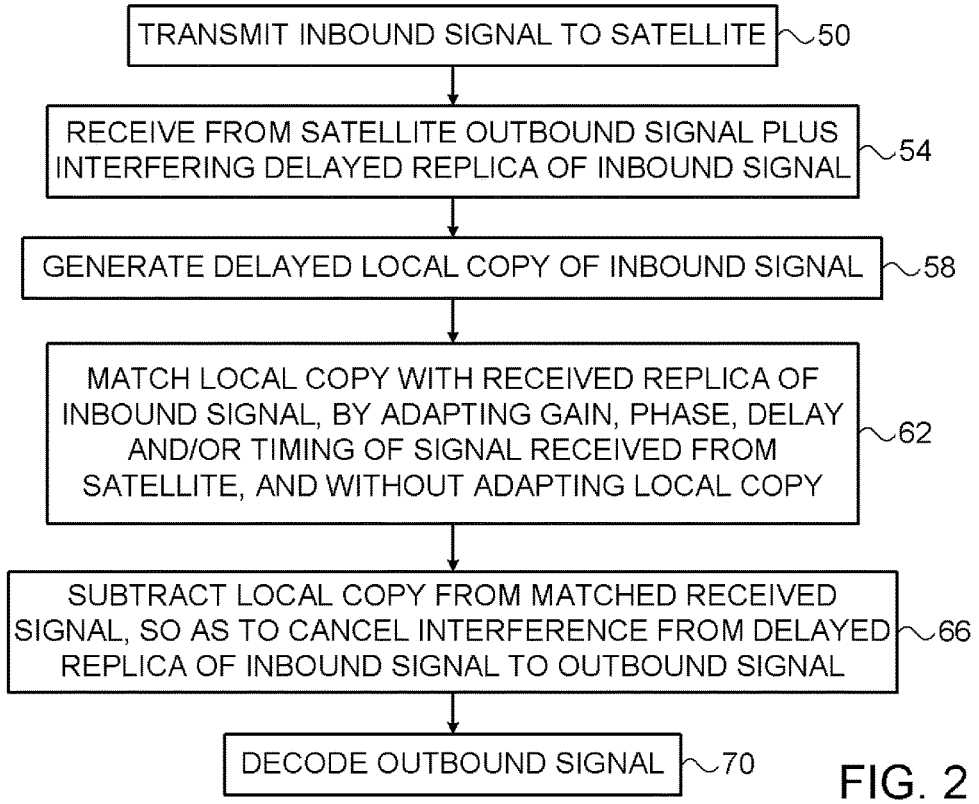
FIG. 2 is a flow chart that schematically illustrates a method for echo cancellation in a satellite communication system, in accordance with an embodiment of the present invention.

FIG. 2 is a flow chart that schematically illustrates a method for echo cancellation in system 20, in accordance with an embodiment of the present invention. The method begins with terminal 28 transmitting an inbound signal to satellite 32, at a transmission step 50. The satellite retransmits the inbound signal to hub 24. Terminal 28 receives from the satellite a received signal, at a reception step 54. The received signal comprises a desired signal (the outbound signal) and an undesired signal (a replica of the transmitted inbound signal that is retransmitted by the satellite).

Terminal 28 generates a delayed local copy of the inbound (transmitted) signal, at a local copy generation step 58. The terminal typically generates the local copy digitally, e.g., by delaying the stream of digital samples from which the inbound signal is produced. The delay applied to the local copy is on the order of the round-trip delay between terminal 28 and satellite 32, plus processing delay. This delay aims to approximate the delay (seen at terminal 28) between the transmitted inbound signal and the undesired replica of the inbound signal that is received from satellite 32.

Terminal 28 performs a coherent matching between the delayed local copy and the undesired replica of the inbound signal, at a signal matching step 62. In order to match the two signals, typically digitally, the terminal adapts the amplitude, phase, frequency and/or timing of the received outbound signal. The matching process attempts to coherently match the respective parameters (amplitude, phase, frequency and/or timing) of the delayed local copy of the inbound signal.

The terminal then subtracts the local copy from the matched received signal, at a subtraction step 66. Subtraction is typically implemented digitally in modem 44, by subtracting respective streams of digital samples. The term "subtraction" refers to any suitable implementation of coherent subtraction, e.g., summation in anti-phase. The subtraction result comprises an interference-reduced received signal, in which the desired outbound signal is dominant and the undesired replica of the inbound signal is suppressed. Terminal 28 decodes the resulting interference-reduced received signal, at a decoding step 70.

Figure 3:
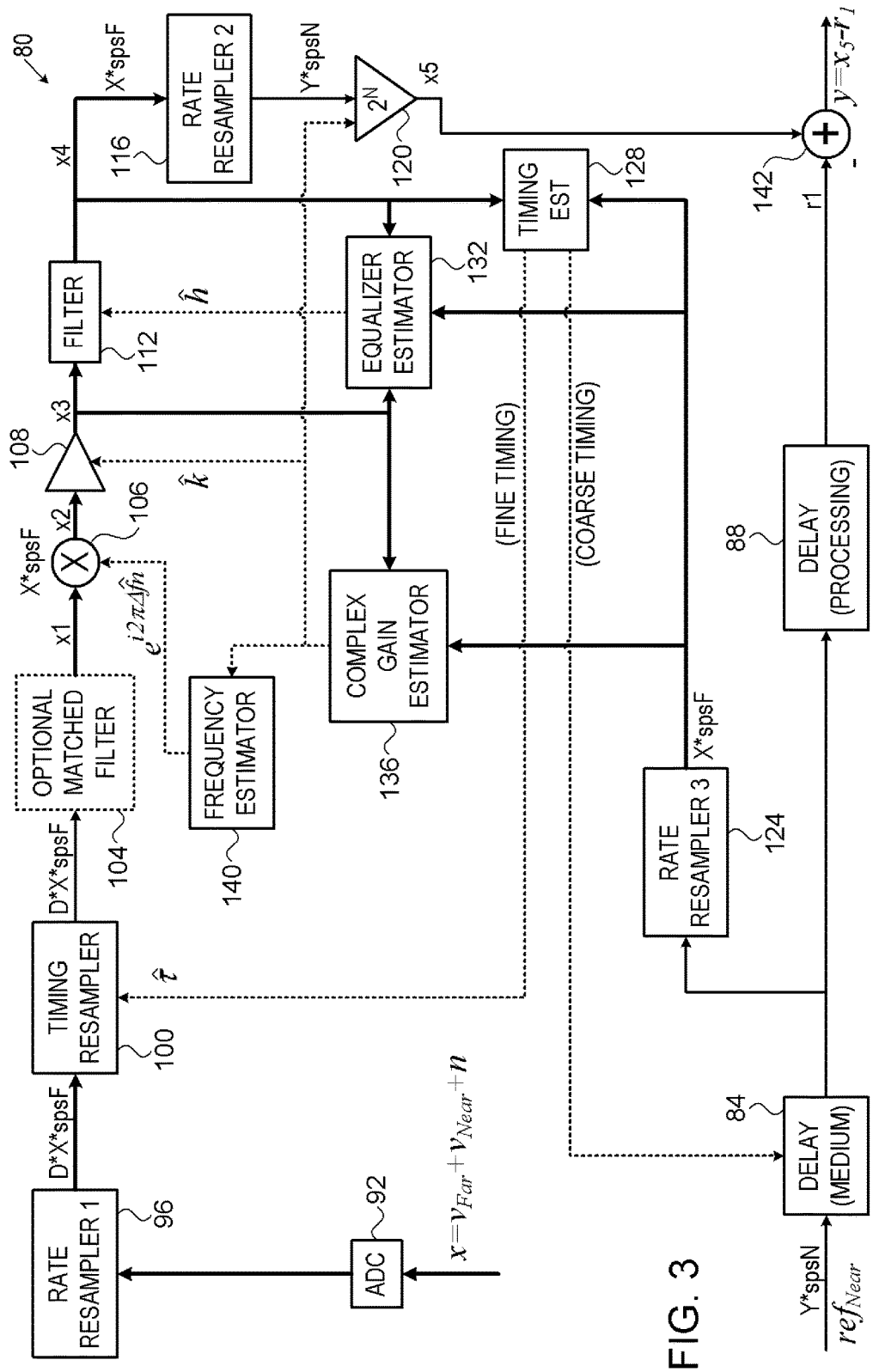
FIG. 3 is a block diagram that schematically illustrates an echo cancellation unit, in accordance with an embodiment of the present invention.

FIG. 3 is a block diagram that schematically illustrates an echo cancellation unit 80, which carries out the method of FIG. 2, in accordance with an embodiment of the present invention. Unit 80 may be implemented, for example, as part of modem 44 of terminal 28.

Unit 80 receives two inputs—the received signal denoted x, and a local copy of the transmitted signal denoted $ref_{Near}$. The received signal x comprises a sum of the desired signal (denoted $v_{Far}$), the delayed replica of the transmitted signal (denoted $v_{Near}$) and a noise term (denoted n). The description that follows begins with the processing applied to the received signal (at the top of FIG. 3). The processing applied to $ref_{Near}$ (at the bottom of the figure) is described further below. As can be seen in the figure, the bottom path that processes $ref_{Near}$ is non-adaptive, and adaptation of amplitude, phase, frequency and/or timing are applied only to the received signal in the upper path.

Signal paths are illustrated in the figure using solid lines, and control paths are illustrated using dashed lines. Signal paths whose sampling rates are derived from the desired signal $v_{Far}$ are illustrated using thick solid lines, and signal paths whose sampling rates are derived from the replica of the transmitted signal $ref_{Near}$ are illustrated using thin solid lines.

The processing path of the received signal x begins with an Analog-to-Digital Converter (ADC) 92 that samples (digitizes) the received signal at a suitable sampling rate. A rate resampler 96 modifies the sampling rate of the digital signal produced by the ADC. Resampler 96 may be implemented, for example, using one or more Half-Band Filter (HBF) interpolators, HBF decimators or adjacent-channel removal filter followed by a linear or cubic resampler.

The sampling rate at the output of resampler 96 is D·X·spsF, wherein D denotes the decimation rate of a matched filter 104 that optionally follows resampler 96, X denotes a programmable number and spsF denotes the number of samples per symbol of the desired ("far") signal. Depending on the ADC sampling rate and on D·X·spsF, resampler 96 may decimate or interpolate the received signal (i.e, either decrease or increase the signal sampling rate).

In embodiments in which resampler 96 is not followed by matched filter 104, then D=1 and the sampling rate at the output of resampler 96 is X·spsF. In a typical embodiment, spsF=2. In embodiments in which resampler 96 is followed by matched filter 104, then the sampling rate at the output of resampler 96 is X·spsF if the matched filter does not modify the sampling rate, or D·X·spsF if the matched filter performs decimation.

A timing resampler 100 resamples the signal (typically without changing the sampling rate), in order to apply a fine timing shift that aligns the timing of $v_{Near}$ (the undesired replica of the transmitted signal) and $v_{Far}$ (the desired signal).

Matched filter 104 is typically included in unit 80 when X·spsF equals 1 spsF. In such a case, in order to decimate to 1 spsF without aliasing, the signal should be filtered first by a matched filter. One advantage of using matched filter 104 is that the following echo-cancellation functions, and specifically equalization, can be performed at a relatively low rate of 1 spsF.

The signal at the output of matched filter 104 (or at the output of resampler 100 if the matched filter is omitted) is denoted x1. The signal is rotated (frequency shifted) using a rotator (mixer) 106 to produce a rotated signal denoted x2. The frequency shift compensates for the frequency offset between $v_{Near}$ (the undesired replica of the transmitted signal) and $v_{Far}$ (the desired signal).

Following rotation, the signal is scaled by a complex gain stage 108, so as to perform the amplitude (gain) and phase alignment between $v_{Near}$ and $v_{Far}$. The signal at the output of gain stage 108 is denoted x3. An adaptive equalizer filter 112 compensates for the Inter-Symbol Interference (ISI) response (or transfer function) that causes $v_{Near}$ (the undesired replica of the transmitted signal) to differ from $ref_{Near}$ (the local copy of the transmitted signal). This ISI may be caused, for example, by cabling, filtering in the satellite input and output multiplexers (IMUX, OMUX), or by any other ISI source. The signal at the output of filter 112 is denoted x4. If a matched filter is included, filter 112 will typically also perform the function of a shaping filter to restore the original pulse shape of the transmitted signal.

A second resampler 116 modifies the sampling rate of the signal to Y·spsN, which is the sampling rate of the delayed local copy of the transmitted signal (delayed copy of $ref_{Near}$). For example, the local copy may be sampled at 1 spsN (before shaping filter) or 2 spsN (after shaping filter). A gain stage 120 scales the signal by a factor of $2^N$, n order to improve dynamic range. Gain stage 120 is typically implemented by shifting the signal samples by N bits. N may be positive or negative, i.e., stage 120 may shift the signal samples to the right or to the left.

The local copy of the transmitted signal ($ref_{Near}$) typically comprises a digital signal that is extracted from the transmitter of modem 44. This signal may comprise, for example, a filtered version of the full-band signal to be transmitted. This sort of implementation is advantageous, for example, when the desired signal occupies narrower bandwidth than the transmitted signal. In such embodiments, portions of the local copy that fall outside this filtering operation (outside the bandwidth of the desired received signal) do not affect the echo cancellation operation.

The processing path of $ref_{Near}$ comprises two cascaded delay units that delay the local copy of the transmitted signal. A medium delay unit 84 delays the signal by an integer number of samples, which approximates the signal delay until $v_{Near}$ (the undesired replica of the transmitted signal) arrives at the upper path of FIG. 3. This delay is determined by coarse timing estimation, which is non-adaptive. The delay of unit 80 may be set, for example, to a fixed delay that is larger than the maximal supported channel ("medium") round-trip plus the residual delay of the upper signal path. Note that medium delay unit 84 is typically limited to applying delays of an integer number of spsN samples—the sampling rate of $ref_{Near}$. Resampler 100 (in the upper path) typically compensates for fine timing shifts that cannot be compensated by unit 84.

A processing delay unit 88 compensates for the delay that the echo cancellation process adds to the received signal x by the various elements of unit 80. The delayed local copy at the output of delay unit 88 is denoted r1. An adder 142 subtracts the delayed local copy r1 from the adapted received signal x5. The output of adder 142, denoted y, comprises an interference-reduced of the received signal x, in which the desired signal $v_{Far}$ is dominant and the interfering signal $v_{Near}$ is suppressed.

The adaptation of gain, phase, frequency and timing of the received signal in the upper path of unit 80 is controlled by control circuitry. In the present example the control circuitry comprises a third resampler 124, a frequency estimator 140, a complex gain estimator 136, a timing estimator 128 and an equalizer estimator 132.

Resampler 124 modifies the sampling rate of the delayed $ref_{Near}$ signal to X·spsF, so that is serve as a reference for training estimators 136, 128 and 132. Frequency estimator 140 estimates the carrier frequency mismatch between $v_{Near}$ and $ref_{Near}$. Complex gain estimator 136 estimates the gain and phase mismatch between $v_{Near}$ and $ref_{Near}$. Timing estimator 128 estimates the timing mismatch between $v_{Near}$ and $ref_{Near}$. The estimation is divided into coarse estimation (integer samples at the sampling rate of Y·spsN) and fine estimation (sub-sample offset that cannot be represented as integer samples at the sampling rate of Y·spsN). Equalizer estimator 132 estimates the ISI transfer function (also referred to as ISI channel or ISI response) between $v_{Near}$ and $ref_{Near}$. Estimator 132 may adapt filter 112 using any suitable adaptation algorithm.

In the example of FIG. 3, timing estimator 128 compares the output of resampler 124 with the equalized signal x4 produced by filter 112. In alternative embodiments, however, timing estimator 128 may compare the output of resampler 124 with signal x3, i.e., with the received signal before equalization.

After subtraction of r1 from x5, modem 44 continues to process the interference-reduced output signal y so as to decode the received signal.

Typically, the bandwidths and symbol rate of $x_{Far}$ (the desired signal originated by $v_{Far}$) and $x_{Near}$ (the undesired signal originated by $v_{Near}$) are the same or similar. The disclosed techniques, however, can also be used in scenarios in which the undesired signal and the desired signal have different bandwidths. (The occupied bandwidths of the two signals may differ even if they have the same symbol rate, e.g., due to different roll-off factors.)

The sampling rate X·spsF may be adapted over a range of possible values, for example between 2 spsF to 4 spsF. This adaptation may simplify the implementation of some of the resamplers in unit 80, for example by allowing them to interpolate only by factors of $2^M$, where M is integer.

The scheme shown in FIG. 3 has considerable performance and implementation advantages, due to the fact that adaptation is carried out on the received signal (upper path) while keeping the local copy of the transmitted signal (lower path) non-adaptive. For example, since most of the processing tasks in unit 80 are aligned to X·spsF, the control circuitry (e.g., estimators 136, 132 and 128) and the various amplitude/phase/frequency/timing compensation units (e.g., resampler 100, rotator 106, gain stage 108 and filter 112) may operate at a low rate of 1 spsF or 2 spsF. In particular, in the typical scenario in which the desired and undesired signals have the same bandwidth, equalization by filter 112 and timing adaptation by resampler 100 can be performed at 1 spsF with a small number of filter taps.

Moreover, since the desired signal and the undesired replica of the transmitted signal pass through some common Inter-Symbol-Interference (ISI) sources (e.g., the satellite input and output multiplexers), the echo cancellation operation also compensates for this common ISI. As a result, additional equalization of the interference-reduced signal y is eliminated or at least simplified considerably. In other words, the equalization performed by filter 112 may be sufficient, and eliminate the need for an additional equalizer for signal y following unit 80. In other embodiments, some residual equalization may still be needed, but can be performed using a short and simple equalizer filter.

Echo Cancellation in Multi-Carrier Scenarios

In some embodiments, hub 24 transmits a broadband outbound signal to multiple terminals 28, and each terminal transmits a narrower-bandwidth inbound signal. This sort of scenario is common, for example, in Very Small Aperture Terminal (VSAT) systems.

Figure 4:
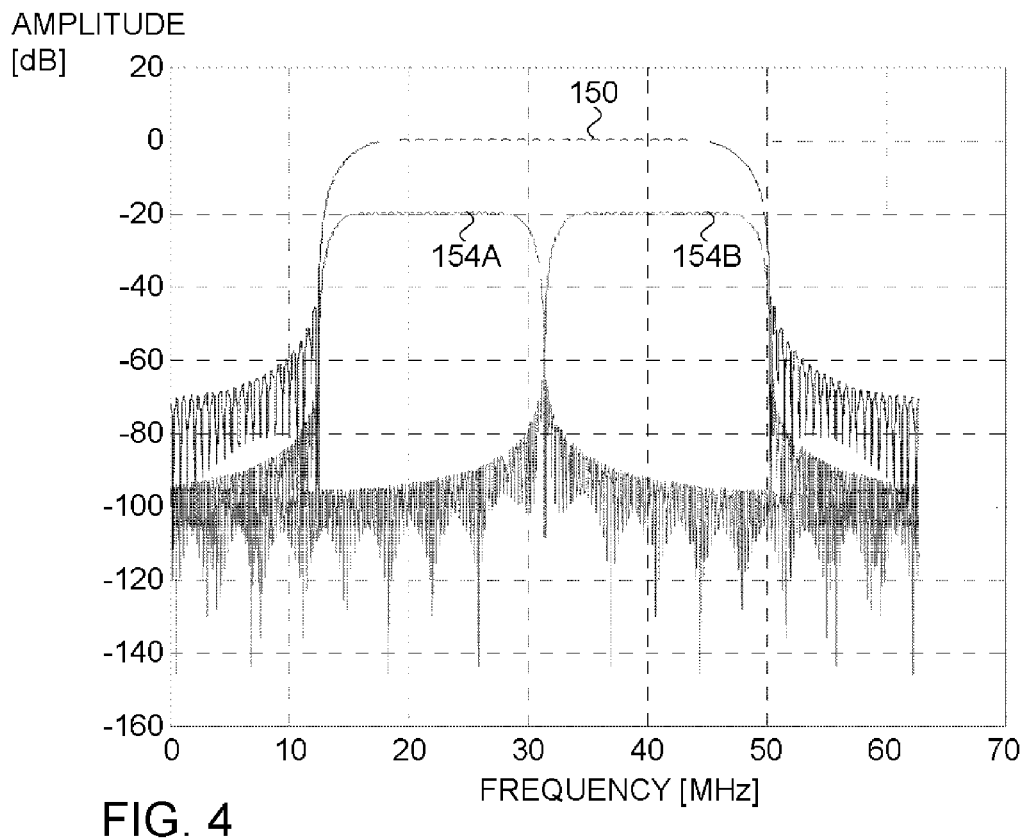
FIG. 4 is a graph showing spectra of outbound and inbound signals in a satellite communication system, in accordance with an embodiment of the present invention.

FIG. 4 is a graph showing spectra of outbound and inbound signals in such a system, in accordance with an embodiment of the present invention. A curve 150 shows the spectrum of the outbound signal, and curves 154A and 154B show the spectra of inbound signals transmitted by two terminals 28. In alternative embodiments, similar scenarios may involve more than two terminals.

In some embodiments, hub 24 comprises multiple modems that share common signals in order to enable each of the modems to perform echo cancellation for its respective inbound signal.

FIG. 5 is a block diagram that schematically illustrates a satellite communication system, in accordance with another embodiment of the present invention. The system of FIG. 5 comprises a hub 160 that communicates via a satellite 168 with two terminals 164A and 164B (denoted STATION 1 and STATION 2). The inbound and outbound signals in this example system have spectra as shown in FIG. 4 above.

Hub 160 comprises two modems 172 and 176. Modem 172 is configured to receive the inbound signal from terminal 164A (having spectrum 154A in FIG. 4), and modem 176 is configured to receive the inbound signal from terminal 164B (having spectrum 154B in FIG. 4). In addition, without loss of generality, modem 172 is configured to transmit the broadband outbound signal (having spectrum 150 in FIG. 4). Thus, modem 176 is configured for reception only, whereas modem 172 is configured for both transmission and reception.

In some embodiments, even though modem 176 does not perform transmission, it still accepts the outbound data (denoted TX DATA) in order to perform echo cancellation. The outbound data in this context is regarded as an auxiliary signal, which is used by modem 176 for echo cancellation. Modem 176 typically performs part of the outbound transmission processing on TX DATA, in order to generate a delayed local copy of the transmitted signal for echo cancellation. In other words, modem 176 generates a digital signal, which is equivalent to the inbound signal that is generated and ultimately transmitted by modem 172. In modem 176, however, the digital signal is only used for echo cancellation and not actually up-converted to RF transmitted.

In order for this technique to function properly, modems 172 and 176 should be configured to operate in the same mode, e.g., to produce the same sequence of modulated symbols. For example, if insertion of dummy frames is used, then both modems should insert the same dummy frames at the same timing.

In an alternative embodiment, modem 172 generates the local copy of the transmitted signal, and provides this signal to modem 176 as an auxiliary signal (instead of providing TX data). The local copy is denoted "REF SIGNAL" in the figure. In this embodiment, modem 176 does not have to generate the local copy of the transmitted signal for use in echo cancellation, but rather to accept it from modem 172.

In some embodiments, hub 24 communicates with N terminals 28, such that each terminal is allocated a respective spectral slice for transmitting the inbound signal. The spectra of the (narrowband) inbound signals overlap the spectrum of the (broadband) outbound signal, as shown in FIG. 4. For the $i^{th}$ terminal, the terminals $j \neq i$ are referred to as "foreign terminals," and their corresponding echoes within the spectrum of the outbound signal are referred to as "foreign echoes" of the $i^{th}$ terminal. For any $i=1,2,\ldots,N$, the $i^{th}$ terminal may or may not cancel its own echo within the spectrum of the outbound signal. In either case, the $i^{th}$ terminal will suffer from a foreign echo, caused by some or all of the foreign stations. Typically, the foreign echo cannot be cancelled at the $i^{th}$ terminal, because the local copies of the transmitted signals from the foreign terminals are usually not available at the $i^{th}$ terminal.

Echo Cancellation at Intermediate Frequency (IF)

In the embodiments described above, the assumption was that signal processing in unit 80 is performed at baseband. In these embodiments, the digital signals in unit 80 are complex (represented using In-phase/Quadrature—I/Q representation) and are centered at zero Hz. ADC 92 in these embodiments typically comprises a pair of ADCs connected in quadrature.

In alternative embodiments, sampling and signal processing in unit 80 is performed at Intermediate Frequency (IF) using real sampling and real signal representation. In these embodiments, ADC 92 typically comprises a single high-speed converter.

Figure 6:
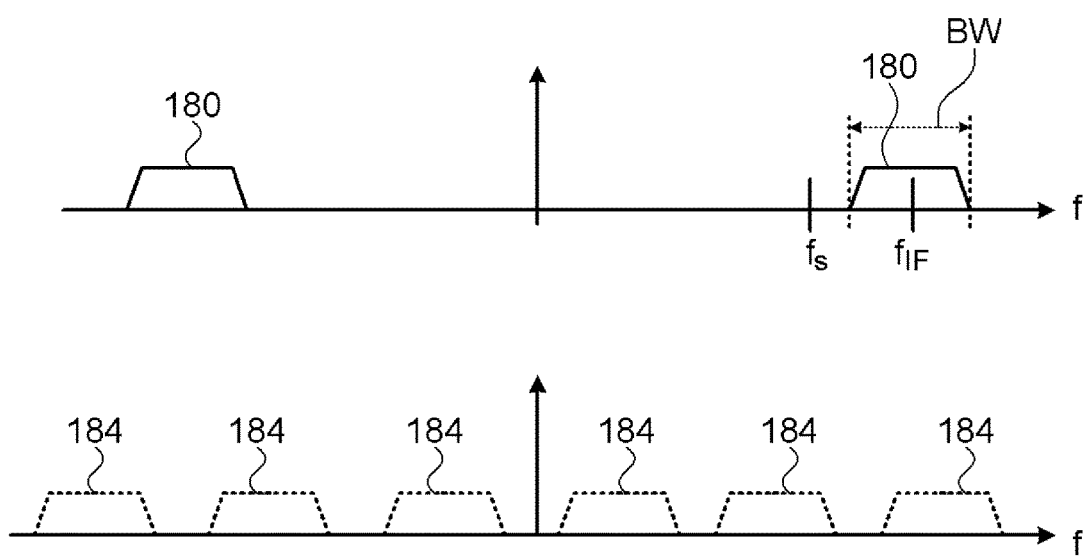
FIG. 6 is a diagram that schematically illustrates Intermediate Frequency (IF) signals used in echo cancellation, in accordance with an embodiment of the present invention.

FIG. 6 is a diagram that schematically illustrates spectra of Intermediate Frequency (IF) signals used in echo cancellation, in accordance with an embodiment of the present invention. The top graph shows a spectrum of an analog IF signal 180 at the input to unit 80, i.e., at the input of ADC 92. Signal 180 has been down-converted by front end 40 from RF to a center frequency denoted $f_{IF}$. The signal bandwidth is denoted BW. ADC 92 samples this signal with a sampling rate denoted $f_s$, which is at least twice the signal bandwidth, i.e., $f_s \geq 2 \cdot BW$.

The bottom graph in FIG. 6 shows a spectrum of the digital signal, which ADC 92 produces by sampling signal 180. As can be seen in the figure, the digital signal comprises multiple frequency-shifted replicas 184 of the original signal. The condition $f_s \geq 2 \cdot BW$ ensures that replicas 184 do not overlap one another.

After sampling, a digital filter is used for retaining one of replicas 184 and filtering-out the other replicas. Digital processing of the received signal is then performed on the filtered signal, similarly to the scheme of FIG. 3 above.

IF digital signal processing is sometimes preferable over baseband digital signal processing, for example because it is possible to use real (as opposed to complex) algebra, because it is not sensitive to I/Q mismatch errors and DC offset errors, and because it is able to achieve finer frequency and timing estimation due to the higher sampling rate. On the other hand, IF digital signal processing typically involves higher sampling rates (usually at least 2 sps).

The system, terminal and circuitry configurations shown in FIGS. 1, 3 and 5 are example configurations, which are chosen purely for the sake of conceptual clarity. In alternative embodiments, any other suitable configurations can be used. Elements that are not mandatory for understanding of the disclosed techniques have been omitted from the figure for the sake of clarity.

The elements of system 20, and in particular terminal 28, e.g., modem 44, circuitry 80 or other elements, can be implemented using hardware, such as in one or more Radio Frequency Integrated Circuits (RFICs), Application-Specific Integrated Circuits (ASICs) or Field-Programmable Gate Arrays (FPGAs). Alternatively, some elements the system or terminal may be implemented is software, or using a combination of hardware and software elements.

Certain elements, e.g., parts of modem 44 or unit 80, may be implemented using a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Although the embodiments described herein mainly address echo cancellation in satellite communication systems, the methods and systems described herein can also be used in other applications that cope with echoes of transmitted signals, such as in a Time Division Duplex (TDD) transceiver in which the guard time between transmission and reception time intervals is not sufficiently long, for canceling clutter in radar systems, for reducing reverberations in audio systems, or in any other suitable application.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a transceiver, receiving from a repeater a received signal, which comprises a desired signal for reception and an undesired replica of a transmitted signal that was transmitted from the transceiver and retransmitted by the repeater;
   generating in the transceiver a local copy of the transmitted signal;
   matching the local copy with the undesired replica of the transmitted signal in the received signal, by:
   (i) adapting the received signal; and
   (ii) applying only a delay to the local copy; and
   canceling an interference caused by the undesired replica to the desired signal, by subtracting the local copy from the adapted received signal.

2. The method according to claim 1, wherein the repeater comprises a satellite.

3. The method according to claim 1, wherein the received signal and the transmitted signal occupy overlapping spectra.

4. The method according to claim 1, wherein adapting the received signal comprises adjusting at least one parameter selected from a group of parameters consisting of an amplitude, a phase, a frequency and a timing of the received signal, so as to match the respective at least one parameter of the local copy.

5. The method according to claim 1, wherein adapting the received signal comprises estimating an Inter-Symbol Interference (ISI) transfer function between the received signal and the local copy, and filtering the received signal using the ISI transfer function.

6. The method according to claim 1, wherein generating the local copy comprises delaying a stream of digital samples that are used for producing the transmitted signal.

7. The method according to claim 1, wherein the transceiver includes a first modem and a second modem, and comprising:
   using the first modem, transmitting the transmitted signal to first and second terminals, and receiving a first received signal from the first terminal; and
   using the second modem, receiving a second received signal from the second terminal, accepting from the first modem an auxiliary signal that is indicative of the transmitted signal, and using the auxiliary signal to cancel the interference caused by the undesired replica of the transmitted signal to the second received signal.

8. The method according to claim 7, wherein the auxiliary signal comprises data that is modulated by the first modem so as to produce the transmitted signal.

9. The method according to claim 7, wherein the auxiliary signal comprises the local copy of the transmitted signal, produced in the first modem.

10. The method according to claim 1, wherein receiving the received signal comprises sampling the received signal using baseband sampling, and wherein generating the local copy, matching the local copy with the undesired replica and canceling the interference comprise performing In-phase/Quadrature signal processing.

11. The method according to claim 1, wherein receiving the received signal comprises sampling the received signal using Intermediate Frequency (IF) sampling, and wherein generating the local copy, matching the local copy with the undesired replica and canceling the interference comprise performing real-value signal processing.

12. Apparatus, comprising:
   a front end, which is configured to exchange signals with a repeater; and
   a modem, which is configured to receive from the repeater via the front end a received signal, which comprises a desired signal for reception and an undesired replica of a transmitted signal that was transmitted from the apparatus and retransmitted by the repeater, to generate a local copy of the transmitted signal, to match the local copy with the undesired replica of the transmitted signal in the received signal, by (i) adapting the received signal and (ii) applying only a delay to the local copy, and to cancel an interference caused by the undesired replica to the desired signal, by subtracting the local copy from the adapted received signal.

13. The apparatus according to claim 12, wherein the repeater comprises a satellite.

14. The apparatus according to claim 12, wherein the received signal and the transmitted signal occupy overlapping spectra.

15. The apparatus according to claim 12, wherein the modem is configured to adapt the received signal by adjusting at least one parameter selected from a group of parameters consisting of an amplitude, a phase, a frequency and a timing of the received signal, so as to match the respective at least one parameter of the local copy.

16. The apparatus according to claim 12, wherein the modem is configured to adapt the received signal by estimating an Inter-Symbol Interference (ISI) transfer function between the received signal and the local copy, and filtering the received signal using the ISI transfer function.

17. The apparatus according to claim 12, wherein the modem is configured to generate the local copy by delaying a stream of digital samples that are used for producing the transmitted signal.

18. The apparatus according to claim 12, wherein the modem comprises:
   a first modem, which is configured to transmit the transmitted signal to first and second terminals, and to receive a first received signal from the first terminal; and
   a second modem, which is configured to receive a second received signal from the second terminal, to accept from the first modem an auxiliary signal that is indicative of the transmitted signal, and to use the auxiliary signal to cancel the interference caused by the undesired replica of the transmitted signal to the second received signal.

19. The apparatus according to claim 18, wherein the auxiliary signal comprises data that is modulated by the first modem so as to produce the transmitted signal.

20. The apparatus according to claim 18, wherein the auxiliary signal comprises the local copy of the transmitted signal, produced in the first modem.

21. The apparatus according to claim 12, wherein the received signal is sampled using baseband sampling, and wherein the modem is configured to generate the local copy, to match the local copy with the undesired replica and to cancel the interference by performing In-phase/Quadrature signal processing.

22. The apparatus according to claim 12, wherein the received signal is sampled using Intermediate Frequency (IF) sampling, and wherein the modem is configured to generate the local copy, to match the local copy with the undesired replica and to cancel the interference by performing real-value signal processing.

23. A method, comprising:
   in a transceiver, receiving from a repeater a received signal, which comprises a desired signal for reception and an undesired replica of a transmitted signal that was transmitted from the transceiver and retransmitted by the repeater;
   sampling the received signal using Intermediate Frequency (IF) sampling;
   using real-value signal processing operations, generating in the transceiver a local digital copy of the transmitted signal, matching the local copy with the undesired replica of the transmitted signal in the IF-sampled received signal, by (i) adapting the received signal and (ii) applying only a delay to the local copy, and canceling an interference caused by the undesired replica to the desired signal, by subtracting the local copy from the adapted received signal.

24. Apparatus, comprising:
   a front end, which is configured to exchange signals with a repeater; and
   a modem, which is configured to sample the received signal using Intermediate Frequency (IF) sampling, and, using real-value signal processing operations, to generate a local digital copy of the transmitted signal, to match the local copy with the undesired replica of the transmitted signal in the IF-sampled received signal by (i) adapting the received signal and (ii) applying only a delay to the local copy, and to cancel an interference caused by the undesired replica to the desired signal, by subtracting the local copy from the adapted received signal.

* * * * *